US011360939B2

(12) United States Patent
Duale et al.

(10) Patent No.: US 11,360,939 B2
(45) Date of Patent: Jun. 14, 2022

(54) TESTING OF FILE SYSTEM EVENTS TRIGGERED BY FILE ACCESS

(71) Applicant: INTERNATIONAL BUSINESS MACHINES CORPORATION, Armonk, NY (US)

(72) Inventors: Ali Y. Duale, Poughkeepsie, NY (US); Mustafa Mah, Poughkeepsie, NY (US); Asmahan Ali, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 333 days.

(21) Appl. No.: 15/986,089

(22) Filed: May 22, 2018

(65) Prior Publication Data

US 2019/0361990 A1 Nov. 28, 2019

(51) Int. Cl.
*G06F 16/17* (2019.01)
*G06F 16/13* (2019.01)
*G06F 16/11* (2019.01)

(52) U.S. Cl.
CPC ........ *G06F 16/1734* (2019.01); *G06F 16/122* (2019.01); *G06F 16/13* (2019.01)

(58) Field of Classification Search
CPC ..... G06F 16/1734; G06F 16/13; G06F 16/122
See application file for complete search history.

(56) References Cited

U.S. PATENT DOCUMENTS 8,051,204 B2 11/2011 Kai et al.
8,161,496 B2 4/2012 Paliswait et al.
2011/0231458 A1* 9/2011 Sutoh ............... G06F 16/119
707/827
2014/0304401 A1* 10/2014 Jagadish ........... H04L 41/0853
709/224
2014/0317681 A1* 10/2014 Shende ............... H04L 63/10
726/1
2014/0325486 A1* 10/2014 Zhang .............. G06F 11/3664
717/125
2015/0347923 A1* 12/2015 Bartley ............ G06F 11/0709
706/12
2016/0034492 A1* 2/2016 Harrison ............ G06F 16/951
707/652
2017/0206217 A1* 7/2017 Deshpande ....... G06Q 10/0833
(Continued)

OTHER PUBLICATIONS

Andrews, James H., "Testing Using Log File Analysis: Tools, Methods, and Issues," 13th IEEE International Conference on Automated Software Engineering, Oct. 1998, pp. 1-10.

(Continued)

*Primary Examiner* — William B Partridge
*Assistant Examiner* — Aryan D Toughiry
(74) *Attorney, Agent, or Firm* — Teddi Maranzano, Esq.; Kevin P. Radigan, Esq.; Heslin Rothenberg Farley & Mesiti P.C.

(57) ABSTRACT

Testing is performed to ensure integrity of a file system auditing component and of a file system. A list of file access events is built. This list includes expected events that should be triggered by the file system and found in a log. The events in the list are run on the file system and logged. The log of expected events is then compared with actual events logged by the file system to determine the integrity of the file system auditing component and the file system.

19 Claims, 11 Drawing Sheets

(56) References Cited

U.S. PATENT DOCUMENTS

2017/0316343 A1* 11/2017 Shamsi .................. G06N 20/00
2018/0189339 A1* 7/2018 Ananthakrishnan ........................
                                                        G06F 16/1734
2019/0095491 A1* 3/2019 Bhattacharjee ..... G06F 16/2433

OTHER PUBLICATIONS

Cheng, Long et al., "Efficient Event Correlation over Distributed Systems," $17^{th}$ IEEE/ACM International Symposium on Cluster, Cloud and Grid Computing, Jul. 2017, pp. 1-10.
Fu, Qiang et al., "Execution Anomaly Detection in Distributed Systems through Unstructured Log Analysis," $9^{th}$ IEEE International Conference on Data Mining, Dec. 2009, pp. 1-10.
Garcia Banuelos, et al., "Complete and Interpretable Conformance Checking of Business Processes," Transactions on Software Engineering, Feb. 2017, pp. 1-29.
Holub, Viliam, et al., "Run-Time Correlation Engine for System Monitoring and Testing," ICAC-INDST '09 Proceedings of the 6th International Conference Industry Session on Autonomic Computing and Communications Industry Session, Jun. 2009, pp. 9-17.
IBM, "Power ISA—V2.07B," Apr. 9, 2015, pp. 1-1527.
IBM, "z/ Architecture—Principles of Operation," IBM Publication No. SA22-7832-10, Eleventh Edition, Mar. 2015, pp. 1-1732.
Mell, Peter and Tim Grance, "The NIST Definition of Cloud Computing," National Institute of Standards and Technology, Information Technology Laboratory, Special Publication 800-145, Sep. 2011, pp. 1-7.

* cited by examiner

SELECT, FOR MULTIPLE SELECTED USERS, MULTIPLE SETS OF EVENTS TO BE PERFORMED ON MULTIPLE SETS OF FILES OF A FILE SYSTEM OF A COMPUTING ENVIRONMENT ~ 400

A SET OF EVENTS OF THE MULTIPLE SETS OF EVENTS FOR A USER OF THE MULTIPLE SELECTED USERS INCLUDES ONE OR MORE SELECTED EVENTS TO BE PERFORMED ON A SET OF FILES OF THE MULTIPLE SETS OF FILES ~ 402

EXECUTE THE MULTIPLE SETS OF EVENTS ON THE MULTIPLE SETS OF FILES FOR THE MULTIPLE SELECTED USERS ~ 404

OBTAIN MULTIPLE LOGS FOR THE MULTIPLE SELECTED USERS, BASED ON THE EXECUTING THE MULTIPLE SETS OF EVENTS ON THE MULTIPLE SETS OF FILES FOR THE MULTIPLE SELECTED USERS ~ 406

MERGE THE MULTIPLE LOGS, BASED ON FILES OF THE MULTIPLE SETS OF FILES, TO PROVIDE MULTIPLE MERGED LOGS ~ 408

A MERGED LOG OF THE MULTIPLE MERGED LOGS INCLUDES EVENTS PERFORMED BY THE MULTIPLE SELECTED USERS FOR A PARTICULAR FILE OF THE FILES OF THE MULTIPLE SETS OF FILES ~ 410

SORT THE MULTIPLE MERGED LOGS BASED ON A SELECTED CRITERION TO PROVIDE MULTIPLE SORTED MERGED LOGS ~ 412

COMPARE THE MULTIPLE SORTED MERGED LOGS WITH MULTIPLE MERGED FILE SYSTEM LOGS TO GENERATE A REPORT OF EVENTS ~ 414

TAKE ACTION TO FACILITATE PROCESSING WITHIN THE COMPUTING ENVIRONMENT, BASED ON THE REPORT ~ 416

MERGE MULTIPLE FILE SYSTEM LOGS TO PROVIDE THE MULTIPLE MERGED FILE SYSTEM LOGS ~ 418

A MERGED FILE SYSTEM LOG INCLUDES EVENTS FOR A PARTICULAR FILE SYSTEM FILE FOR THE MULTIPLE SELECTED USERS ~ 420

FIG. 4A

THE SELECTED CRITERION INCLUDES TIME ORDER ~430

THE SET OF FILES INCLUDES ONE OR MORE RANDOMLY SELECTED FILES OF THE FILE SYSTEM ~432

THE ONE OR MORE SELECTED EVENTS ARE RANDOMLY SELECTED ~434

THE ONE OR MORE SELECTED EVENTS ARE SELECTED FROM A GROUP OF EVENTS CONSISTING OF: OPEN, WRITE, DELETE, CHANGE OWNER, READ AND LIST ~436

THE ONE OR MORE SELECTED EVENTS INCLUDE READ AND WRITE ~438

THE TAKING ACTION INCLUDES INITIATING RECOVERY OF ONE OR MORE FILES OF THE FILE SYSTEM, INITIATING RECOVERY OF A FILE SYSTEM AUDITING COMPONENT AND/OR INITIATING REVISION OF THE FILE SYSTEM AUDITING COMPONENT ~440

THE REPORT INCLUDES ONE OR MORE RESULTS SELECTED FROM A GROUP CONSISTING OF: FALSE POSITIVES THAT INCLUDE ONE OR MORE EVENTS LOGGED BY THE FILE SYSTEM BUT NOT BY A TEST OF THE FILE SYSTEM, FALSE NEGATIVES THAT INCLUDE ONE OR MORE EVENTS NOT LOGGED BY THE FILE SYSTEM BUT LOGGED BY THE TEST, ONE OR MORE EVENTS OUT-OF-ORDER, AND ONE OR MORE ACCURATE EVENTS ~442

FIG. 4B

TESTING OF FILE SYSTEM EVENTS TRIGGERED BY FILE ACCESS

BACKGROUND

One or more aspects relate, in general, to computing environments, and in particular, to file systems of such environments.

A file system is used to control how data is stored and returned. It may include structures and logic rules used to manage groups of information (files) and their names. It can be used on numerous different types of storage devices that use different kinds of media.

Files can be shared objects among a set of authorized users. For instance, a file may be a database table that multiple users are appending to, altering or deleting entries therefrom. A user can read, write, edit or delete from files, as examples. A file may be copied, which is considered a read access. Other operations may be performed on files.

A file system may generate an event every time a file is accessed, and log the following, as examples: access time, user ID, client IP (internet protocol) address, and access type (e.g., read, write, edit, delete, open, change owner, etc.). File accesses may be initiated by an insider thread or an external hacker with compromised credentials.

Features, such as file audit and folder watch, are security features designed to track the nature of file accesses within a file system. An IT (information technology) security department typically tries to identify suspicious access from users with valid credentials. File audit and folder watch aid in tracking file accesses and can identify any unauthorized activities performed in the file system.

SUMMARY

Shortcomings of the prior art are overcome and additional advantages are provided through the provision of a computer program product for facilitating processing within a computing environment. The computer program product includes a computer readable storage medium readable by a processing circuit and storing instructions for performing a method. The method includes selecting for multiple selected users, multiple sets of events to be performed on multiple sets of files of a file system of the computing environment. A set of events of the multiple sets of events for a user of the multiple selected users includes one or more selected events to be performed on a set of files of the multiple sets of files. The multiple sets of events are executed on the multiple sets of files for the multiple selected users, and based on the executing the multiple sets of events on the multiple sets of files for the multiple selected users, multiple logs for the multiple selected users are obtained. The multiple logs are merged, based on files of the multiple sets of files, to provide multiple merged logs. A merged log of the multiple merged logs includes events performed by the multiple selected users for a particular file of the files of the multiple sets of files. The multiple merged logs are sorted based on a selected criterion to provide multiple sorted merged logs. The multiple sorted merged logs are compared with multiple merged file system logs to generate a report of events. Based on the report, action is taken to facilitate processing within the computing environment.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 4A-4B depict one embodiment of facilitating processing within a computing environment that includes testing of file system logs, in accordance with an aspect of the present invention;

DETAILED DESCRIPTION

One or more aspects relate to testing file system logs to ensure accuracy of the logs, and therefore, the file system. In one embodiment, the authenticity of file system events is tested to ensure that a randomly generated set of file access events are correctly and chronologically logged by a file system auditing subsystem. This testing is to ensure that, for example, a file system (also referred to herein as a file system daemon) is not logging false positives where an event is logged that did not take place; or logging false negatives, where events that took place are not logged, as examples.

To test the authenticity of events triggered by the file system daemon, a capability is provided that identifies and tracks a random set of operations, and then, verifies if those known operations are logged by the file system auditing subsystem in the correct order. Expected events are compared against the actual events logged by the file system auditing subsystem.

One embodiment of a computing environment to include and use one or more aspects of the present invention is described with reference to FIG. 1. In one example, the computing environment may be based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. Z/ARCHITECTURE is a registered trademark of International Business Machines Corporation, Armonk, N.Y., USA.

In another example, the computing environment may be based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The computing environment may also be based on other architectures, including, but not limited to, the Intel x86 architectures. Other examples also exist.

Figure 1:
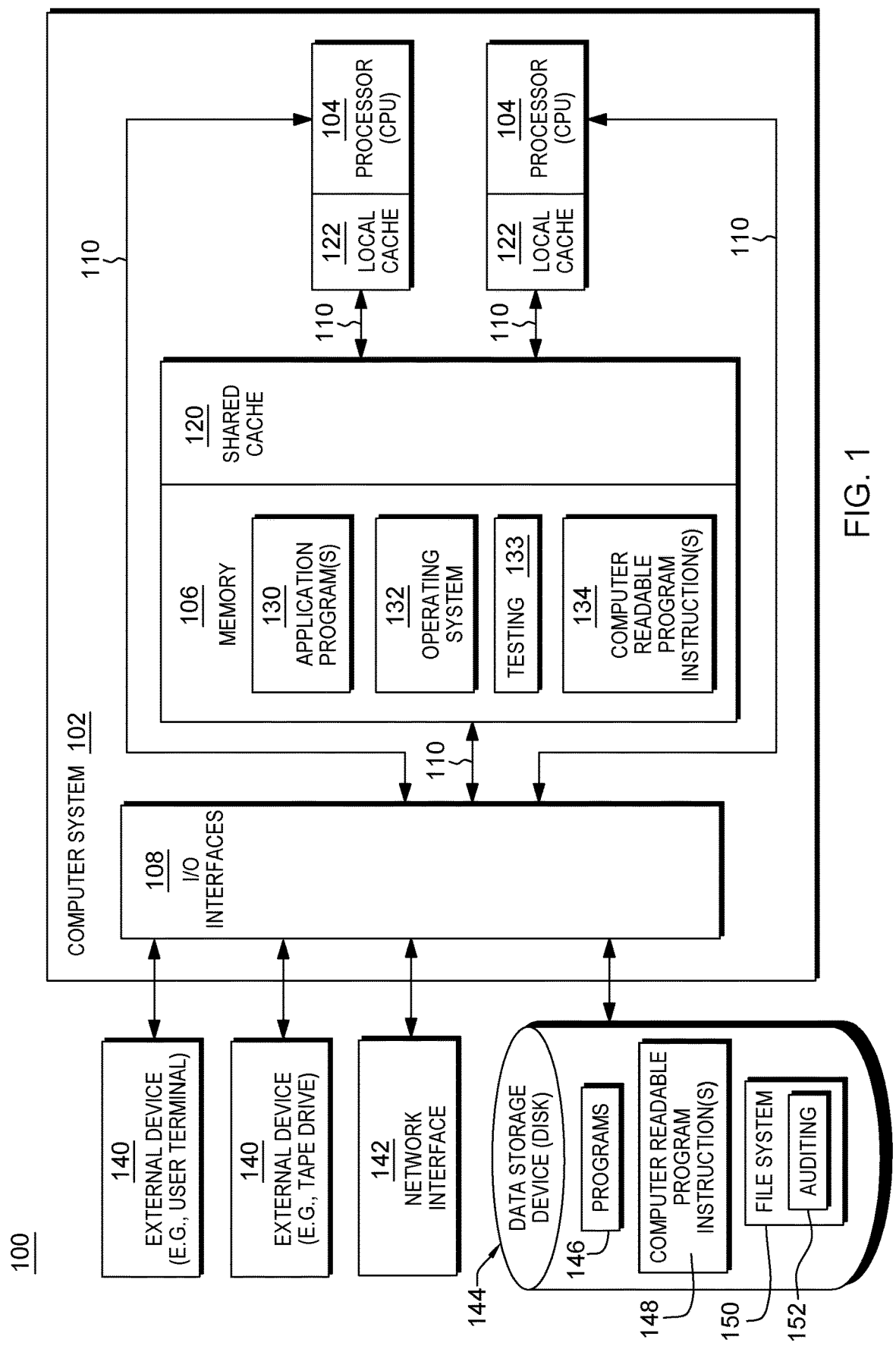
FIG. 1 depicts one example of a computing environment to incorporate and use one or more aspects of the present invention.

As shown in FIG. 1, a computing environment 100 includes, for instance, a computer system 102 shown, e.g., in the form of a general-purpose computing device. Computer system 102 may include, but is not limited to, one or more processors or processing units 104 (e.g., central processing units (CPUs)), a memory 106 (a.k.a., system memory, main memory, main storage, central storage or storage, as examples), and one or more input/output (I/O) interfaces 108, coupled to one another via one or more buses and/or other connections 110.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 120, such as a shared cache, which may be coupled to local caches 122 of processors 104. Further, memory 106 may include one or more programs or applications 130 and an operating system 132. Moreover, in accordance with one or more aspects of the present invention, memory 106 includes a testing component or engine 133 used in testing the file system logs. Additionally, memory 106 may include one or more computer readable program instructions 134 that may be configured to carry out functions of embodiments of aspects of the invention.

Computer system 102 may also communicate via, e.g., I/O interfaces 108 with one or more external devices 140, one or more network interfaces 142, and/or one or more data storage devices 144. Example external devices include a user terminal, a tape drive, a pointing device, a display, etc. Network interface 142 enables computer system 102 to communicate with one or more networks, such as a local area network (LAN), a general wide area network (WAN), and/or a public network (e.g., the Internet), providing communication with other computing devices or systems.

Data storage device 144 may store one or more programs 146, one or more computer readable program instructions 148, and/or data, etc. The computer readable program instructions may be configured to carry out functions of embodiments of aspects of the invention. Further, in accordance with one or more aspects, data storage device 144 includes a file system/file system daemon 150 and a file system auditing subsystem 152 (also referred to herein as an auditing component).

File system 150 manages files of the file system and uses file system auditing subsystem 152 to log events performed on the files. In one embodiment, file system auditing subsystem 152 is part of the file system; however, in another embodiment, it may be separate from the file system. Example file system auditing subsystems are offered by International Business Machines Corporation, Armonk, N.Y. (e.g., IBM Spectrum Scale 5.0.0), as well as by other companies. Many examples exist and may be used to log events of a file system.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general purpose or special purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

As indicated, file system auditing component 152 monitors and logs file system events, and in accordance with one or more aspects, testing component 133 verifies that the auditing component is working as designed. To validate that the events that the file system daemon is generating are correct, in one embodiment, a list of file access events (also referred to as events, actions, operations, etc., such as read, write, delete, open, list, change owner (chmod), etc.) is built. This list includes the expected events that should be triggered by the daemon and found in the log. The events in the expected list of events are run on the file system. Then, the actual events logged by the file system daemon are validated against the expected list of events. This is described further with reference to FIGS. 2A-2B.

Figure 2A:
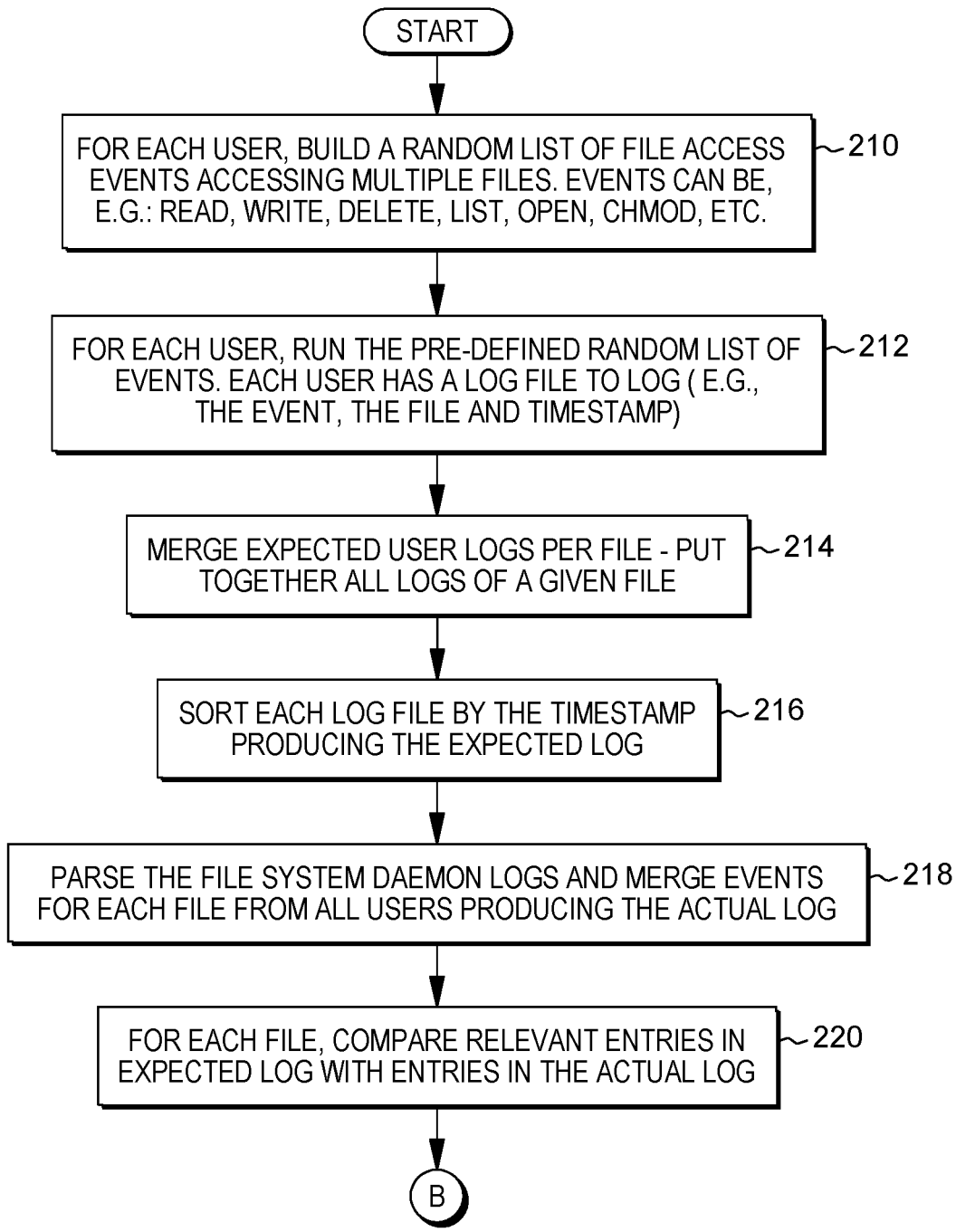
FIGS. 2A-2B depict one embodiment of processing used to test file system logs, in accordance with an aspect of the present invention.
Figure 2B:
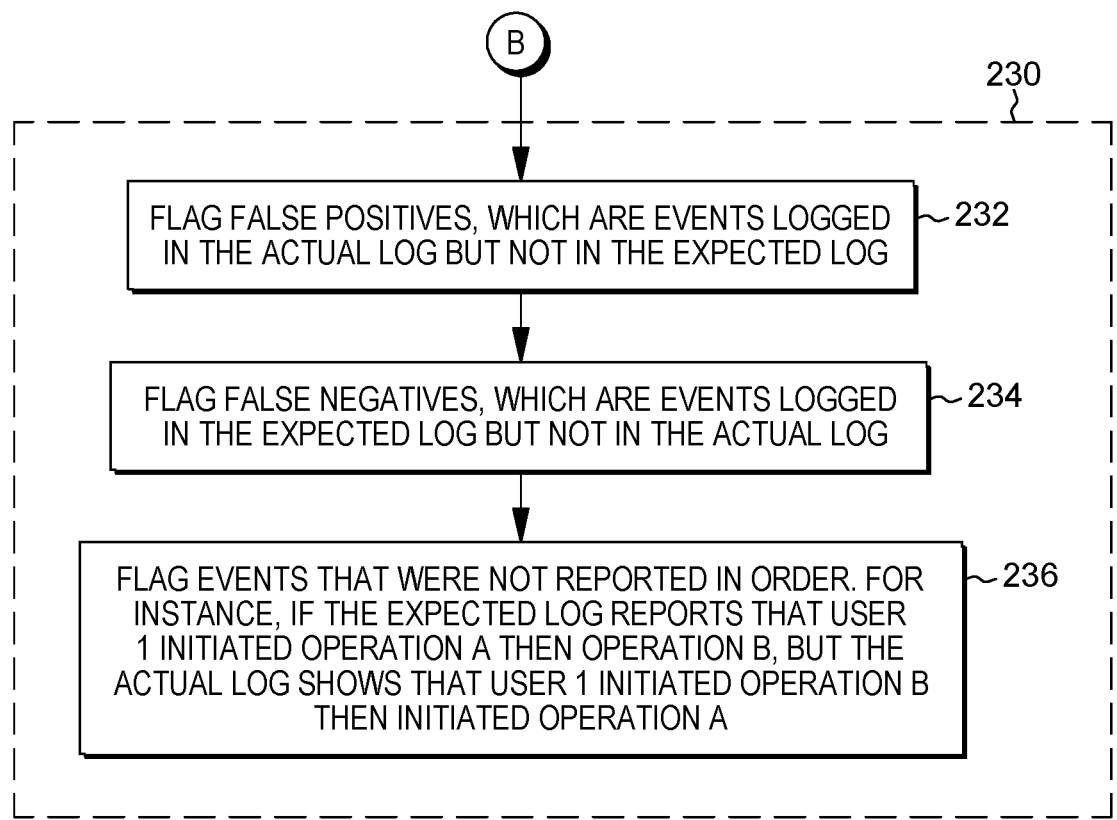

One embodiment of testing file system logs to determine the integrity of the file system auditing component, and thus, the file system, is described with reference to FIGS. 2A-2B. The processing of FIGS. 2A-2B is performed by, for instance, the testing component, unless otherwise specified. In other embodiments, other components may perform one or more of the tasks. The processing of FIGS. 2A-2B may be automatically repeated one or more times to continue the testing.

Referring to FIG. 2A, in one embodiment, for each user of a selected number of users, a random list of file access events (a.k.a., actions, operations) to be used to access multiple select files is built, STEP 210. A user may be a distributed system or other entity that accesses the file system, and the events may include read, write, delete, list, open, change owner, etc., as examples. Any type of randomization technique may be used to randomly select the events for a user. The testing component may use a randomization technique to automatically generate the list for each user. Once randomly generated, the list is considered a predefined random list of events. Similarly, the multiple select files may be randomly selected in a similar manner.

Further, for each of the selected users, the pre-defined random list of events is run, and a log relating to the run is provided for each user, STEP 212. For example, each user has a log file to log events, and the user's log includes an indication of the expected event, the file accessed by the event, and a timestamp, as examples. A merge of the selected user's logs is then performed per file, providing a merged log for each file, STEP 214. Each merged log includes events for a particular file for the selected users. Each merged log file is then sorted by one or more selected criteria, such as by timestamp, producing sorted logs, STEP 216. The set of sorted logs is referred to as the expected log.

Further, the file system daemon logs are parsed and events for each file from the selected users are merged producing a merged file system log for each file, STEP 218. The set of merged file system logs is referred to as the actual log. For each file, the relevant entries in the expected log are compared with the corresponding entries in the actual log to determine the accuracy of the actual log, STEP 220.

As shown in FIG. 2B, based on the comparison, a report 230 is produced. Report 230 may include, for instance, false positives, which are events logged in the actual log but not in the expected log (232); false negatives, which are events logged in the expected log but not in the actual log (234); and events that are not reported in order (236). For instance, if the expected log reports that user 1 initiated operation A then operation B, but the actual log shows that user 1 initiated operation B then operation A, this would be flagged as a not-in-order event. The report may also include accurate events. Other examples are also possible.

Figure 3A:
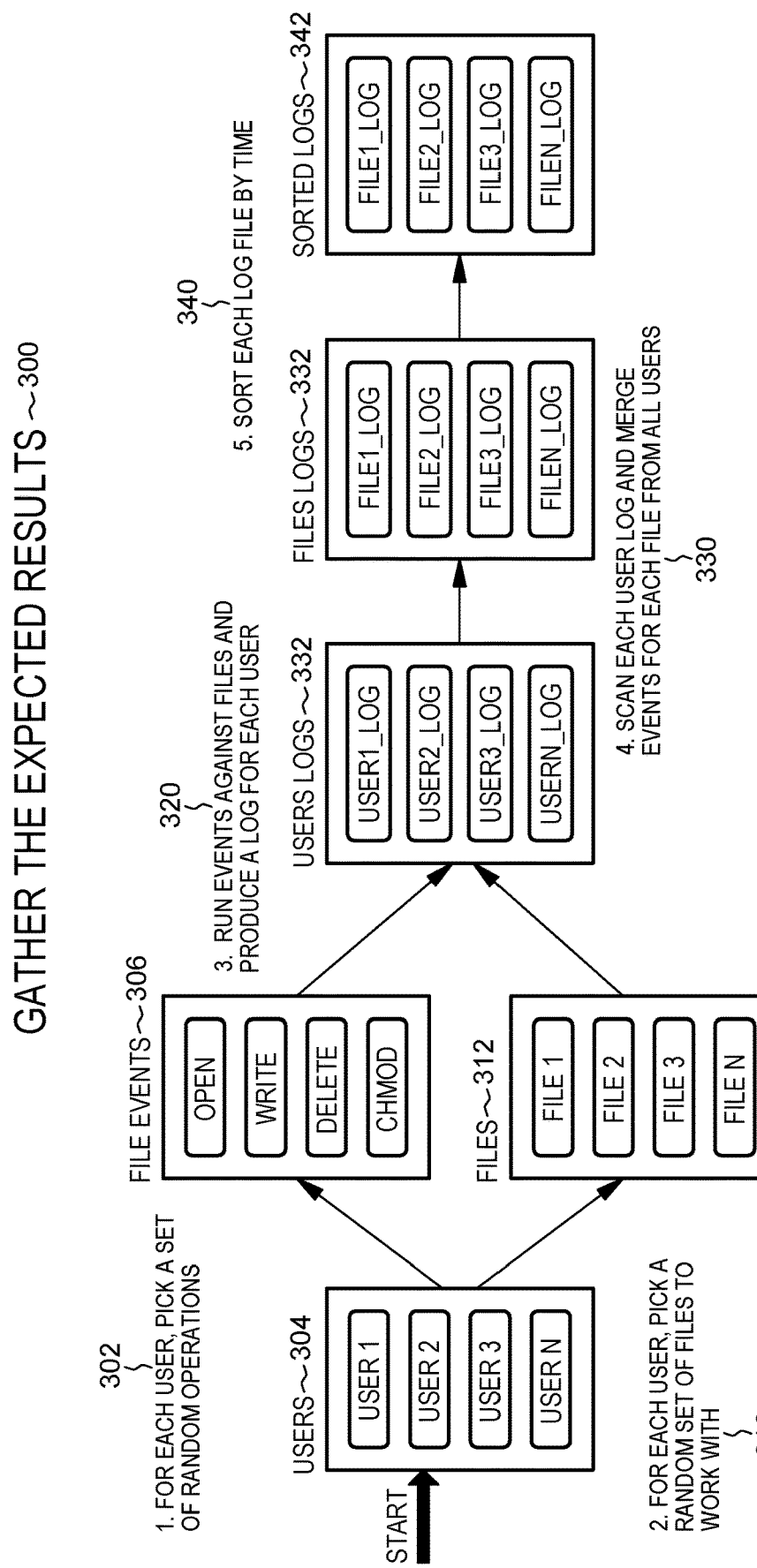
FIGS. 3A-3C depict further details of one embodiment of processing used to test file system logs, in accordance with an aspect of the present invention.
Figure 3B:
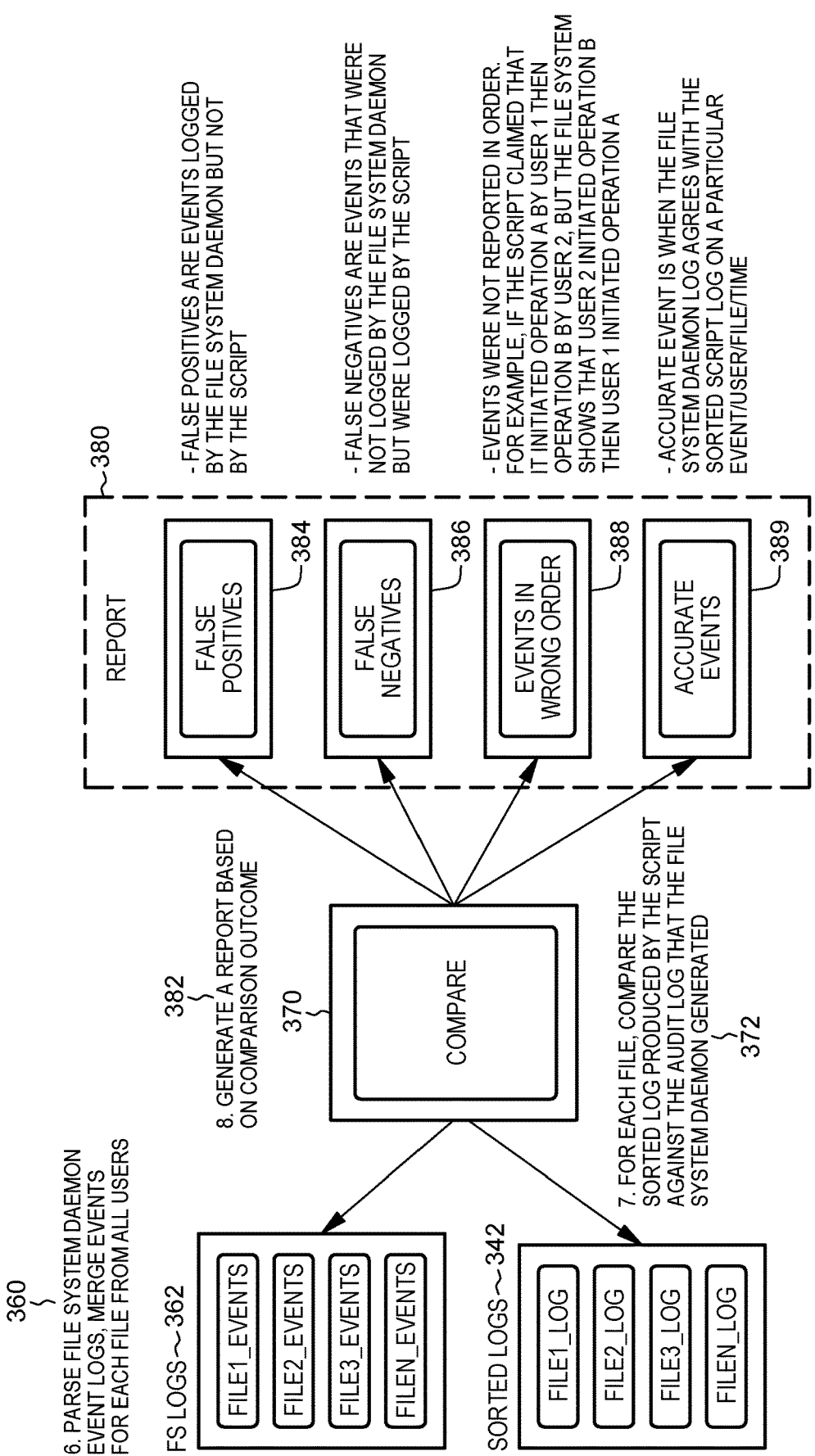

Further details of the testing of file system logs are described with reference to FIGS. 3A-3B. FIG. 3A depicts one example of collecting expected results (i.e., the results that the testing component expects to see in the logs), and FIG. 3B depicts one example of obtaining the actual results and comparing the actual results from the logs with the expected results. The processing of FIGS. 3A-3B is performed by the testing component, unless otherwise specified. In other embodiments, other components may perform one or more of the tasks.

Referring to FIG. 3A, in one embodiment, the expected results are collected, STEP 300. This includes performing a number of tasks. For instance, for each user of a selected number of users, a set of random operations is selected, STEP 302. For example, users (304) include User 1, 2, 3 thru N, and the random set of operations may include file events 306, such as open, write, delete, chmod, etc. A set of one or more of the random events is selected for each user 304. Further, for each user, a random set of files is selected, STEP 310. Example files 312 include File 1, 2, . . . N.

The randomly selected events 306 are run against the randomly selected files and a log is produced for each user, STEP 320. For instance, user logs 322 include User1_ Log . . . User_N Log. Each user log includes information regarding the randomly selected events 306 selected for that user and run against the randomly selected files chosen for that user.

Each user log is scanned and events from the user logs are merged for each file, STEP 330, producing file logs 332. Each file log includes the events performed by the selected users for that file. Each file log is then sorted by one or more selected criteria, such as time, STEP 340, producing sorted file logs 342.

After collecting the expected results, the actual results are obtained and compared to the expected results, as described with reference to FIG. 3B. To obtain the actual results and perform the compare, a number of tasks are performed, STEP 350. In one embodiment, file system daemon event logs (e.g., provided by the auditing component) are parsed, and events for each file from the selected users are merged, STEP 360. This provides a set of file system logs 362, in which each file system log includes the events for the selected users for a particular file. For each file, sorted log 342 produced by the tasks of FIG. 3A, which are part of a test script, is compared (370) against the merged file system logs 362, STEP 372. Based on the compare, a report 380 is generated, STEP 382. Report 380 may include, for example, false positives 384, false negatives 386, events in incorrect order 388, and/or accurate events 389. As indicated, false positives are events logged by the file system daemon, but not by the script log; false negatives are events that were not logged by the file system daemon, but were logged by the script log; events in the wrong order include those events that were not reported in order. Accurate events are those events that the file system daemon log agrees with the sorted script log on a particular event/user/file/time.

Figure 3C:
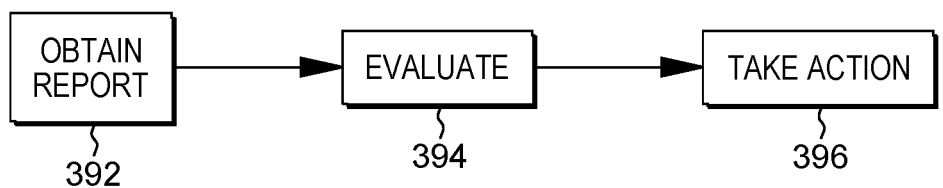

Based on generating the report, one or more actions may be taken, as described with reference to FIG. 3C. In taking an action, a set of tasks may be performed, STEP 390. For instance, the report is obtained by, e.g., a developer, administrator, user, and/or an electronic or hardware component (e.g., a processor or component therein), etc., STEP 392, and evaluated (e.g., manually or automatically using heuristics and/or machine learning), STEP 394. Based thereon, one or more actions are taken, STEP 396. For example, if there is an error, these actions may include, at least initiating: shut down of the file system, revision of the auditing subsystem, recovery of the file system, and/or provision of a further audit, as examples.

As described herein, a testing capability is provided to test the authenticity of file system events to ensure that a randomly generated set of file access events are correctly and chronologically logged by the file system auditing subsystem. The testing is used to discover unknown errors. It includes, e.g., generation of expected results via parallel execution of randomly selected file system commands and the preparing of the expected results via merging and sorting, as described herein. The testing ensures, for instance, that all access types and actions that should be recorded are recorded, and that all of those access types and actions are recorded in correct chronological order.

In one embodiment, the testing includes randomly generating a set of file system events that can be executed against multiple files; selecting a number of file system access users; for each user, choosing a random set of events to run against a set of files (At the beginning of the cycle, maintain a list of the random events that each user will run in a log file); at the end of the cycle, scan each user log and merge events for each file from all selected users (e.g., log 1 contains all events that were triggered for file 1 by all selected users, etc.); sort each file log by time; parse the file system daemon log, and merge events for each file from the users; for each file, compare the sorted log produced by the script against the audit log that the file system generated; and generate a report.

One or more aspects of the present invention are inextricably tied to computer technology and facilitate processing within a computer, improving performance thereof. By detecting an error with the file system audit, appropriate precautions may be taken to ensure the integrity of the file system. By ensuring integrity of the file system, system performance may be improved in recovery procedures, as well as in processing using the files of the file subsystem.

Further details of one embodiment of facilitating processing within a computing environment, as it relates to one or more aspects of the present invention, are described with reference to FIGS. 4A-4B.

Referring to FIG. 4A, in one embodiment, for multiple selected users, multiple sets of events to be performed on multiple sets of files of a file system of a computing environment are selected (400). A set of events of the multiple sets of events for a user of the multiple selected users includes one or more selected events to be performed on a set of files of the multiple sets of files (402). The multiple sets of events are executed on the multiple sets of files for the multiple selected users (404), and based on the executing the multiple sets of events on the multiple sets of files for the multiple selected users, multiple logs for the multiple selected users are obtained (406). The multiple logs are merged, based on files of the multiple sets of files, to provide multiple merged logs (408). A merged log of the multiple merged logs includes events performed by the multiple selected users for a particular file of the files of the multiple sets of files (410). The multiple merged logs are sorted based on a selected criterion to provide multiple sorted merged logs (412). The multiple sorted merged logs are compared with multiple merged file system logs to generate a report of events (414). Based on the report, action is taken to facilitate processing within the computing environment (416).

In one example, to provide the multiple merged file system logs, multiple file system logs are merged (418). A merged file system log includes events for a particular file system file for the multiple selected users (420).

Further, with reference to FIG. 4B, as examples, the selected criterion includes time order (430), the set of files includes one or more randomly selected files of the file system (432), and the one or more selected events are randomly selected (434).

Moreover, in one example, the one or more selected events are selected from a group of events consisting of: open, write, delete, change owner, read and list (436). Additionally, in another example, the one or more selected events include read and write (438). Other examples are possible.

Further, in one or more embodiments, the taking action includes initiating recovery of one or more files of the file system, initiating recovery of a file system auditing component and/or initiating revision of the file system auditing component (440).

Yet further, in one example, the report includes one or more results selected from a group consisting of: false positives that include one or more events logged by the file system but not by a test of the file system, false negatives that include one or more events not logged by the file system but logged by the test, one or more events out-of-order, and one or more accurate events (442).

Other variations and embodiments are possible.

Figure 5A:
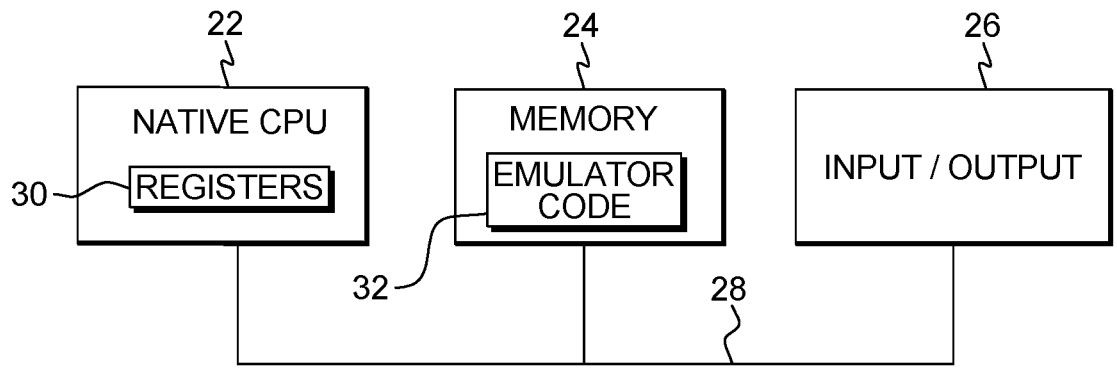
FIG. 5A depicts another example of a computing environment to incorporate and use one or more aspects of the present invention.

Other types of computing environments may also incorporate and use one or more aspects of the present invention, including, but not limited to, emulation environments, an example of which is described with reference to FIG. 5A. In this example, a computing environment 20 includes, for instance, a native central processing unit (CPU) 22, a memory 24, and one or more input/output devices and/or interfaces 26 coupled to one another via, for example, one or more buses 28 and/or other connections. As examples, computing environment 20 may include a PowerPC processor offered by International Business Machines Corporation, Armonk, N.Y.; and/or other machines based on architectures offered by International Business Machines Corporation, Intel, or other companies.

Native central processing unit 22 includes one or more native registers 30, such as one or more general purpose registers and/or one or more special purpose registers used during processing within the environment. These registers include information that represents the state of the environment at any particular point in time.

Moreover, native central processing unit 22 executes instructions and code that are stored in memory 24. In one particular example, the central processing unit executes emulator code 32 stored in memory 24. This code enables the computing environment configured in one architecture to emulate another architecture. For instance, emulator code 32 allows machines based on architectures other than the z/Architecture, such as PowerPC processors, or other servers or processors, to emulate the z/Architecture and to execute software and instructions developed based on the z/Architecture.

Figure 5B:
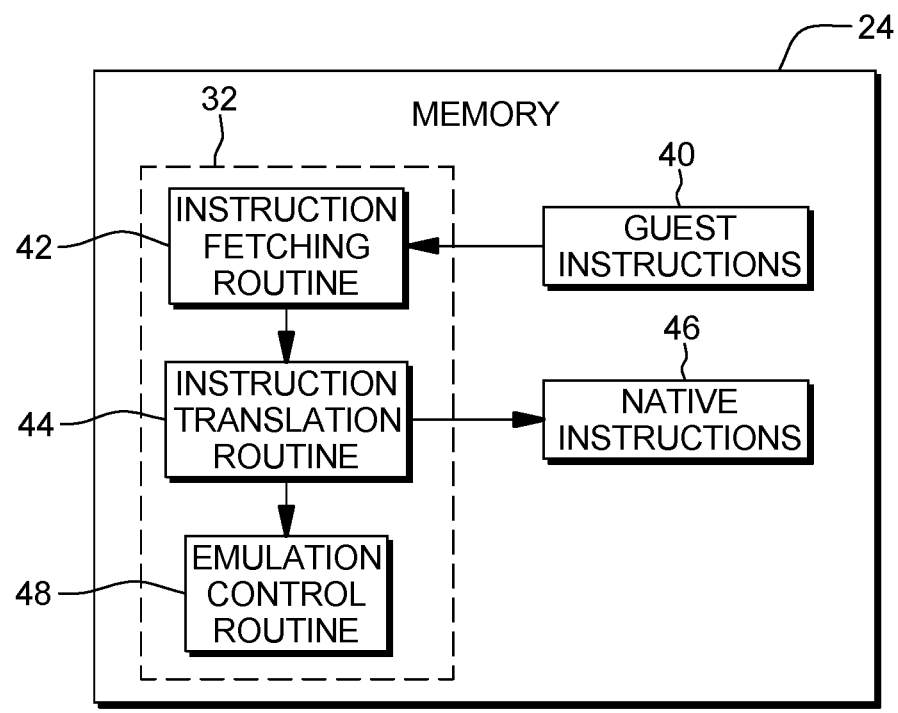
FIG. 5B depicts further details of the memory of FIG. 5A.

Further details relating to emulator code 32 are described with reference to FIG. 5B. Guest instructions 40 stored in memory 24 comprise software instructions (e.g., correlating to machine instructions) that were developed to be executed in an architecture other than that of native CPU 22. For example, guest instructions 40 may have been designed to execute on a z/Architecture processor, but instead, are being emulated on native CPU 22, which may be, for example, an Intel processor. In one example, emulator code 32 includes an instruction fetching routine 42 to obtain one or more guest instructions 40 from memory 24, and to optionally provide local buffering for the instructions obtained. It also includes an instruction translation routine 44 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 32 includes an emulation control routine 48 to cause the native instructions to be executed. Emulation control routine 48 may cause native CPU 22 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 46 may include loading data into a register from memory 24; storing data back to memory from a register; or performing some type of arithmetic or logic operation, as determined by the translation routine.

Each routine is, for instance, implemented in software, which is stored in memory and executed by native central processing unit 22. In other examples, one or more of the routines or operations are implemented in firmware, hardware, software or some combination thereof. The registers of the emulated processor may be emulated using registers 30 of the native CPU or by using locations in memory 24. In embodiments, guest instructions 40, native instructions 46 and emulator code 32 may reside in the same memory or may be disbursed among different memory devices.

As used herein, firmware includes, e.g., the microcode or Millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
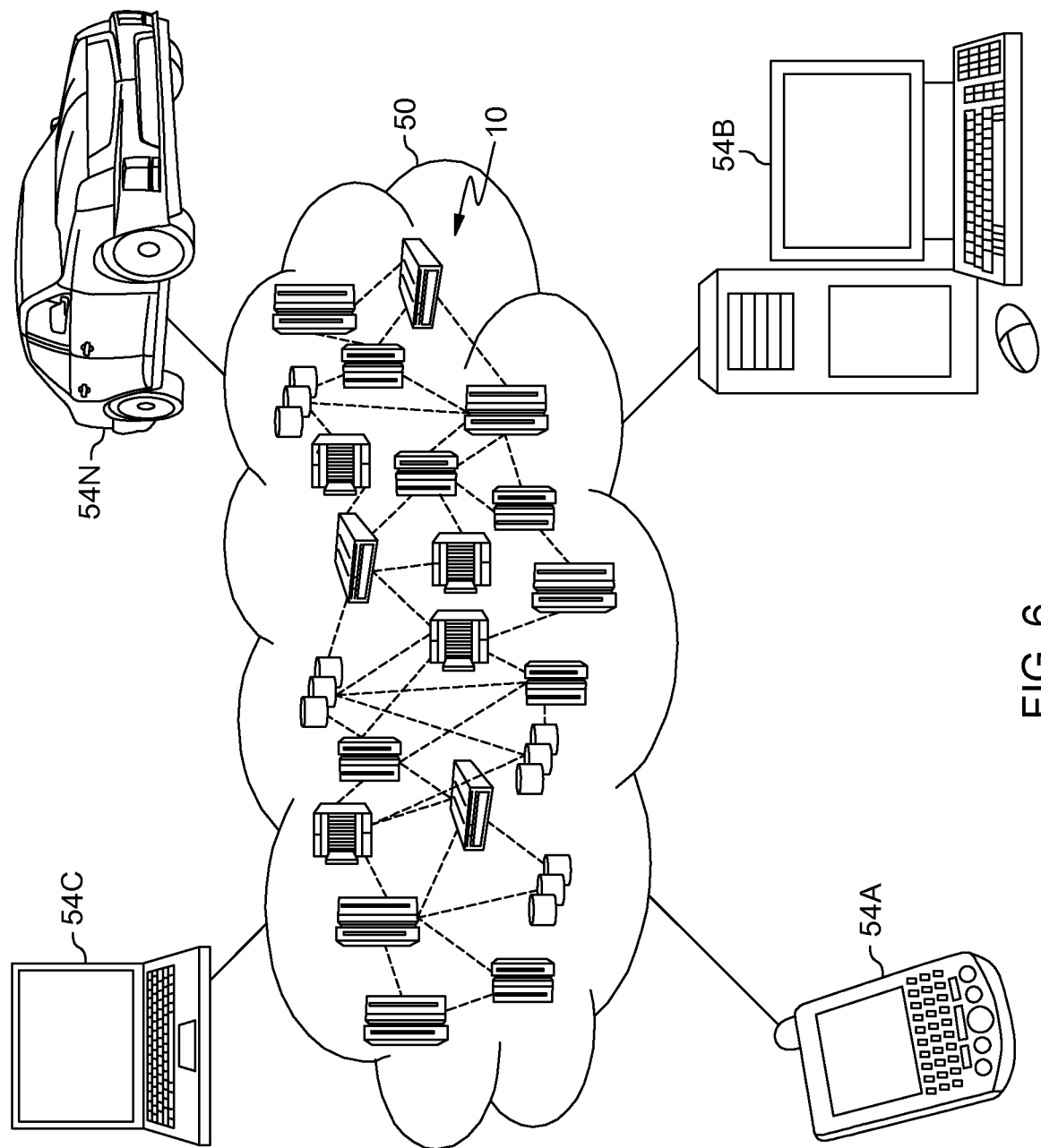
FIG. 6 depicts one embodiment of a cloud computing environment.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
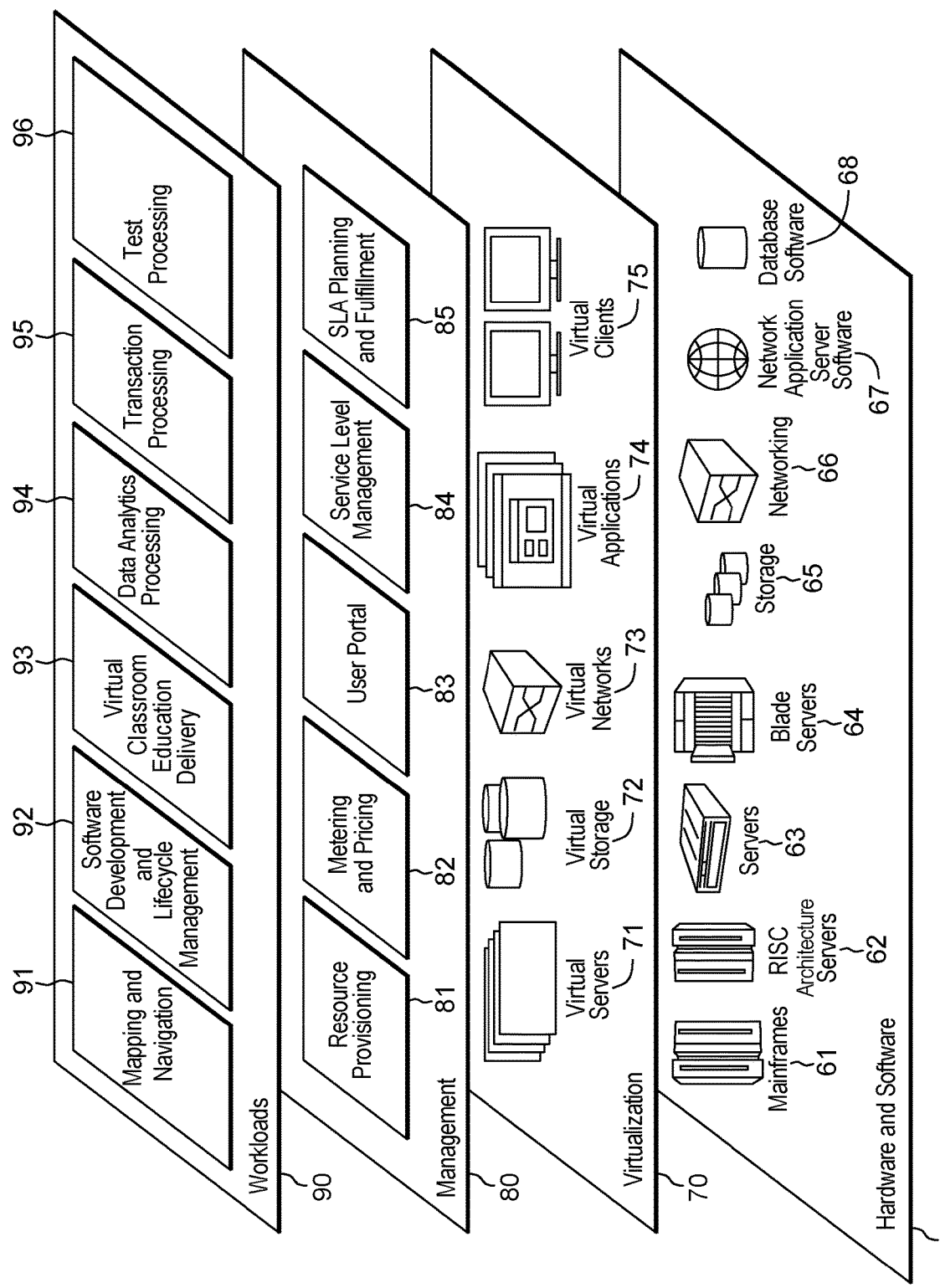
FIG. 7 depicts one example of abstraction model layers.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and test processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different events may be performed. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
　　at least one computer readable storage medium readable by at least one processing circuit and storing instructions for performing a method comprising:
　　　　selecting, for multiple selected users, multiple sets of access events to be performed on multiple sets of files of a file system of the computing environment, the file system used to manage files, and wherein a set of access events of the multiple sets of access events for a user of the multiple selected users comprises one or more selected access events to be performed on a set of files of the multiple sets of files;
　　　　executing the multiple sets of access events on the multiple sets of files for the multiple selected users;
　　　　obtaining multiple logs for the multiple selected users, based on the executing the multiple sets of access events on the multiple sets of files for the multiple selected users;

merging the multiple logs, based on files of the multiple sets of files, to provide multiple merged logs, wherein a merged log of the multiple merged logs includes access events performed by the multiple selected users for a respective particular file of the files of the multiple sets of files;

sorting the multiple merged logs based on a selected criterion to provide expected multiple sorted merged logs, the expected multiple sorted merged logs including access events generated to validate that a file system auditing component of the file system is logging file system access events correctly and chronologically in actual file system logs of the file system;

obtaining, by parsing the actual file system logs, actual multiple merged file system logs of the file system auditing component of the file system, wherein an actual merged file system log of the file system auditing component includes access events for the multiple selected users for a respective particular file;

comparing entries of the expected multiple sorted merged logs with corresponding entries of the actual multiple merged file system logs of the file system auditing component of the file system to generate a report of access events, the report of access events including for a particular file of the files of the multiple sets of files whether the file system auditing component is logging file system access events correctly; and taking action to facilitate processing within the computing environment, based on the report, wherein the taking action includes initiating correction of the file system auditing component of the file system based on the report of access events indicating for the particular file of the multiple sets of files that the file system is generating file system access events incorrectly.

2. The computer program product of claim 1, wherein the method further comprises merging multiple file system logs to obtain the actual multiple merged file system logs, wherein an actual merged file system log includes access events for a particular file system file for the multiple selected users.

3. The computer program product of claim 1, wherein the selected criterion comprises time order.

4. The computer program product of claim 1, wherein the set of files includes one or more randomly selected files of the file system.

5. The computer program product of claim 1, wherein the one or more selected access events are randomly selected.

6. The computer program product of claim 1, wherein the one or more selected access events are selected from a group of access events consisting of: open, write, delete, change owner, read and list.

7. The computer program product of claim 1, wherein the one or more selected access events include read and write.

8. The computer program product of claim 1, wherein the taking action further comprises initiating recovery of one or more files of the file system.

9. The computer program product of claim 1, wherein the report includes one or more results selected from a group consisting of: false positives that include one or more access events logged by the file system but not by a test of the file system, false negatives that include one or more access events not logged by the file system but logged by the test, one or more access events out-of-order, and one or more accurate access events.

10. A computer system for facilitating processing within a computing environment, the computer system comprising:
a memory; and
a processor in communication with the memory, wherein the computer system is configured to perform a method, the method comprising:
selecting, for multiple selected users, multiple sets of access events to be performed on multiple sets of files of a file system of the computing environment, the file system used to manage files, and wherein a set of access events of the multiple sets of access events for a user of the multiple selected users comprises one or more selected access events to be performed on a set of files of the multiple sets of files;

executing the multiple sets of access events on the multiple sets of files for the multiple selected users;

obtaining multiple logs for the multiple selected users, based on the executing the multiple sets of access events on the multiple sets of files for the multiple selected users;

merging the multiple logs, based on files of the multiple sets of files, to provide multiple merged logs, wherein a merged log of the multiple merged logs includes access events performed by the multiple selected users for a respective particular file of the files of the multiple sets of files;

sorting the multiple merged logs based on a selected criterion to provide expected multiple sorted merged logs, the expected multiple sorted merged logs including access events generated to validate that a file system auditing component of the file system is logging file system access events correctly and chronologically in actual file system logs of the file system;

obtaining, by parsing the actual file system logs, actual multiple merged file system logs of the file system auditing component of the file system, wherein an actual merged file system log of the file system auditing component includes access events for the multiple selected users for a respective particular file;

comparing entries of the expected multiple sorted merged logs with corresponding entries of the actual multiple merged file system logs of the file system auditing component of the file system to generate a report of access events, the report of access events including for a particular file of the files of the multiple sets of files whether the file system auditing component is logging file system access events correctly; and taking action to facilitate processing within the computing environment, based on the report, wherein the taking action includes initiating correction of the file system auditing component of the file system based on the report of access events indicating for the particular file of the multiple sets of files that the file system is generating file system access events incorrectly.

11. The computer system of claim 10, wherein the method further comprises merging multiple file system logs to obtain the actual multiple merged file system logs, wherein an actual merged file system log includes access events for a particular file system file for the multiple selected users.

12. The computer system of claim 10, wherein the selected criterion comprises time order.

13. The computer system of claim 10, wherein the one or more selected access events are selected from a group of access events consisting of: open, write, delete, change owner, read and list.

14. The computer system of claim 10, wherein the taking action further comprises initiating recovery of one or more files of the file system.

15. A computer-implemented method of facilitating processing within a computing environment, the computer-implemented method comprising:

selecting, for multiple selected users, multiple sets of access events to be performed on multiple sets of files of a file system of the computing environment, the file system used to manage files, and wherein a set of access events of the multiple sets of access events for a user of the multiple selected users comprises one or more selected access events to be performed on a set of files of the multiple sets of files;

executing the multiple sets of access events on the multiple sets of files for the multiple selected users;

obtaining multiple logs for the multiple selected users, based on the executing the multiple sets of access events on the multiple sets of files for the multiple selected users;

merging the multiple logs, based on files of the multiple sets of files, to provide multiple merged logs, wherein a merged log of the multiple merged logs includes access events performed by the multiple selected users for a respective particular file of the files of the multiple sets of files;

sorting the multiple merged logs based on a selected criterion to provide expected multiple sorted merged logs, the expected multiple sorted merged logs including access events generated to validate that a file system auditing component of the file system is logging file system access events correctly and chronologically in actual file system logs of the file system;

obtaining, by parsing the actual file system logs, actual multiple merged file system logs of the file system auditing component of the file system, wherein an actual merged file system log of the file system auditing component includes access events for the multiple selected users for a respective particular file;

comparing entries of the expected multiple sorted merged logs with corresponding entries of the actual multiple merged file system logs of the file system auditing component of the file system to generate a report of access events, the report of access events including for a particular file of the files of the multiple sets of files whether the file system auditing component is logging file system access events correctly; and taking action to facilitate processing within the computing environment, based on the report, wherein the taking action includes initiating correction of the file system auditing component of the file system based on the report of access events indicating for the particular file of the multiple sets of files that the file system is generating file system access events incorrectly.

16. The computer-implemented method of claim 15, further comprising merging multiple file system logs to obtain the actual multiple merged file system logs, wherein an actual merged file system log includes access events for a particular file system file for the multiple selected users.

17. The computer-implemented method of claim 15, wherein the selected criterion comprises time order.

18. The computer-implemented method of claim 15, wherein the one or more selected access events are selected from a group of events consisting of: open, write, delete, change owner, read and list.

19. The computer-implemented method of claim 15, wherein the taking action further comprises initiating recovery of one or more files of the file system.

* * * * *